DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1308

T921,029

LOW MOLECULAR WEIGHT 2-p-DIOXANONE POLYESTERS

Thomas C. Snapp, Jr., 713 Kay Drive, and Alden E. Blood, 1303 Willow Spring Drive, both of Longview, Tex. 75601

Continuation of abandoned application Ser. No. 274,527, July 24, 1972. This application Oct. 9, 1973, Ser. No. 404,540

Int. Cl. C08g *17/02*

U.S. Cl. 260—18 R

No Drawing. 14 Pages Specification

Compositions which are particularly adapted for use in wax formulations are prepared by polymerizing, in the presence or absence of a catalyst, 2-p-dioxanone with either a polyol having the formula $R—(OH)_n$ wherein R is a $C_2$–$C_6$ alkyl radical and $n$ is an integer of from 2–6; an aliphatic monocarboxylic acid having the formula $R'—COOH$ wherein R' is a $C_7$–$C_{19}$ alkyl radical; an aliphatic monocarboxylic acid ester having the formula $$R^2—\overset{O}{\overset{\|}{C}}—OR—(OH)_{n'}$$

wherein R is as defined above, $R^2$ is a $C_2$–$C_{18}$ alkyl radical and $n'$ is an integer of from 2–5; an alkyl ether having the formula $R(OH)_n—O—R—(OH)_n$ or $$R(OH)_n—O—R—(OH)_n—O—R(OH)_n$$

where R and $n$ are as defined above; or an ether-ester having the formula $$R^3—O—R—(OH)_{n''}—O—\overset{O}{\overset{\|}{C}}—R^4$$

wherein R is as defined above. $R^3$ is a $C_1$–$C_{15}$ alkyl, $R^4$ is a $C_2$–$C_{18}$ alkyl, $n''$ is an integer of from 2–4. The polymer compositions can be from 10:1 to 90:1 mole ratio of 2-p-dioxanone to polyol or monocarboxylic acid, respectively. The polymer compositions are characterized by an acid number of 10–50, a hydroxyl number of 10–75, a molecular weight of 1200–3000, a penetration hardness of 1.5–10.0, and a ring and ball softening point of 75°–105° C.